US009230380B2

(12) United States Patent
Marsden

(10) Patent No.: US 9,230,380 B2
(45) Date of Patent: Jan. 5, 2016

(54) LOCKABLE ENCLOSURE HAVING IMPROVED ACCESS SYSTEM

(75) Inventor: Christopher D. Marsden, Savannah, GA (US)

(73) Assignee: Digitus Biometrics, Inc., Savannah, GA (US)

( * ) Notice: Subject to any disclaimer, the term of this patent is extended or adjusted under 35 U.S.C. 154(b) by 682 days.

(21) Appl. No.: 13/027,241

(22) Filed: Feb. 14, 2011

(65) Prior Publication Data

US 2011/0199183 A1 Aug. 18, 2011

Related U.S. Application Data

(60) Provisional application No. 61/338,000, filed on Feb. 12, 2010.

(51) Int. Cl.
*G05B 19/00* (2006.01)
*G06F 7/00* (2006.01)
(Continued)

(52) U.S. Cl.
CPC .................................. *G07C 9/00563* (2013.01)

(58) Field of Classification Search
CPC ... E05B 47/0012; G06F 21/32; G06F 21/316; G06F 2203/0336; G07C 9/00087; G07C 9/00896; G07C 9/00158; G07C 9/00103; G07C 2209/04; G07C 9/00571; G07C 9/00563
USPC .................................................. 340/5.1–5.92
See application file for complete search history.

(56) References Cited

U.S. PATENT DOCUMENTS

| | | | | |
|---|---|---|---|---|
| 5,006,684 A * | 4/1991 | Wendt et al. | .................. | 219/729 |
| 6,064,316 A * | 5/2000 | Glick et al. | .................. | 340/5.65 |

(Continued)

FOREIGN PATENT DOCUMENTS

| | | | |
|---|---|---|---|
| EP | 1818874 A1 | 8/2007 | |
| EP | 1939820 | 7/2008 | |

(Continued)

OTHER PUBLICATIONS

International Search Report and Written Opinion issued on Apr. 8, 2011 by the International Searching Authority for copending Patent Cooperation Treaty international patent application No. PCT/US2011/024818 filed on Feb. 14, 2011.

(Continued)

*Primary Examiner* — Vernal Brown
*Assistant Examiner* — Muhammad Adnan
(74) *Attorney, Agent, or Firm* — Kilpatrick Townsend & Stockton LLP

(57) ABSTRACT

A biometric security system, including a biometric validation module for receiving a biometric profile (such as a fingerprint scan) and asserting a control signal responsive to a biometric evaluation of the biometric profile for securing access to a physical locking storage unit, such as a cabinet. Disclosed is a system that not only provides secured mechanical locking devices for security and access control, it further augments such a system with a computer controlled biometric access control and access monitoring system. The system is managed by central management software which may encompass a standalone configuration or a networked configuration. Preferred embodiments of the present invention provide a solution that provides a software platform and firmware that provides a control signal controls an electromechanical locking assembly for an electrical physical locking unit, such as a server cabinet having at least one locking/unlocking door panel for gaining entry thereof.

21 Claims, 12 Drawing Sheets

(51) Int. Cl.

| | |
|---|---|
| ***G05B 23/00*** | (2006.01) |
| ***G06K 9/00*** | (2006.01) |
| ***G08C 19/00*** | (2006.01) |
| ***G06T 1/00*** | (2006.01) |
| ***G05B 11/01*** | (2006.01) |
| ***G08C 19/16*** | (2006.01) |
| ***G07C 9/00*** | (2006.01) |

(56) References Cited

U.S. PATENT DOCUMENTS

| | | | | |
|---|---|---|---|---|
| 7,337,469 | B2 * | 2/2008 | Osada et al. | 726/19 |
| 8,207,816 | B2 * | 6/2012 | Crigger et al. | 340/5.52 |
| 8,232,862 | B2 * | 7/2012 | Lowe | 340/5.53 |
| 8,289,135 | B2 * | 10/2012 | Griffin | 340/5.82 |
| 2001/0035813 | A1 * | 11/2001 | Meier | 340/5.72 |
| 2004/0039920 | A1 | 2/2004 | Kim et al. | |
| 2005/0050272 | A1 | 3/2005 | Behrens et al. | |
| 2005/0062238 | A1 * | 3/2005 | Broadfield et al. | 280/1 |
| 2005/0179349 | A1 | 8/2005 | Booth et al. | |
| 2005/0207487 | A1 * | 9/2005 | Monroe | 375/240.01 |
| 2006/0139149 | A1 * | 6/2006 | Faro et al. | 340/5.73 |
| 2006/0224512 | A1 * | 10/2006 | Kurakata | 705/50 |
| 2007/0051026 | A1 | 3/2007 | Vor Keller | |
| 2007/0125100 | A1 * | 6/2007 | Shoenfeld | 62/125 |
| 2007/0198850 | A1 * | 8/2007 | Martin et al. | 713/186 |
| 2008/0214300 | A1 | 9/2008 | Williams et al. | |
| 2009/0008387 | A1 * | 1/2009 | Boxman et al. | 219/757 |
| 2009/0027197 | A1 * | 1/2009 | Frolov | 340/542 |
| 2009/0051535 | A1 * | 2/2009 | Brenner | 340/572.1 |
| 2009/0165511 | A1 | 7/2009 | Lahiri | |
| 2010/0109837 | A1 * | 5/2010 | Sato et al. | 340/5.65 |
| 2010/0193499 | A1 * | 8/2010 | Blazevich | 219/394 |
| 2010/0259360 | A1 | 10/2010 | Brown et al. | |
| 2011/0153497 | A1 * | 6/2011 | Determan | 705/44 |
| 2011/0205351 | A1 * | 8/2011 | Nakamura et al. | 348/79 |

FOREIGN PATENT DOCUMENTS

| | | | |
|---|---|---|---|
| JP | 2000115206 | A | 4/2000 |
| WO | 2004075097 | | 9/2004 |
| WO | 2011100733 | A | 8/2011 |
| WO | 2013082443 | A1 | 6/2013 |

OTHER PUBLICATIONS

International Application No. PCT/US2011/024818, International Preliminary Report on Patentability, issued Aug. 14, 2012, 10 pages.

International Application No. PCT/US2012/067321, International Preliminary Report on Patentability, issued Jun. 3, 2014, 8 pages.

International Application No. PCT/US2011/024818, International Search Report and Written Opinion, mailed Apr. 8, 2011, 11 pages.

International Application No. PCT/US2012/067321, International Search Report and Written Opinion, mailed Feb. 26, 2013, 11 pages.

* cited by examiner

LOCKABLE ENCLOSURE HAVING IMPROVED ACCESS SYSTEM

CROSS REFERENCE TO RELATED APPLICATIONS

The present application claims the benefit of U.S. provisional patent application Ser. No. 61/338,000, filed on Feb. 12, 2010, the entire disclosure of which is hereby incorporated by reference as if set forth verbatim herein and relied upon for all purposes.

FIELD OF THE INVENTION

The present invention relates generally to a lockable enclosure, and, more specifically, to a biometrically-controlled locking system adaptable to existing locking solutions, such as a server cabinet, and for controlling access thereto.

BACKGROUND OF THE INVENTION

There are many cabinets, drawers, doors and the like that are locked using conventional lock-and-key solutions. This configuration is well known, and numerous implementations of this lock and key solution are used in an extremely wide range of solutions. However, there are known drawbacks of lock-and-key solutions, some of which include being able to be physically compromised and/or broken to gain unauthorized entry into secured areas.

For developers of security systems, the challenge lies in balancing convenience and speed of access along with accuracy and precision in controlling access. Users of physical security systems desire systems which are user-friendly, versatile, customizable, and efficient. This is especially necessary for operations particularly in military, education establishments, and healthcare and in research facilities, each of which demands a high level of security.

SUMMARY OF THE INVENTION

The present invention recognizes and addresses the foregoing considerations, and others, of prior art construction and methods.

Certain aspects of the present invention provide both methods and apparatuses for tracking, monitoring, protecting, and safeguarding an inventory of products which may be housed in an electrical physical locking unit such as a self-standing cabinet or enclosure. At least one embodiment of the present invention provides biometric security which authenticates a person, rather than a token, and does not store a fingerprint image.

One particular aspect of the present invention provides a cabinet for housing and securing items stored therein, such as a server system for storage and computational purposes. Disclosed is a system that not only provides secured mechanical locking devices for security and access control, it further augments such a system with a computer controlled biometric access control and access monitoring system. One aspect of the present invention therefore provides a biometric locking system, including a biometric validation module for receiving a biometric profile (such as a fingerprint or retinal scan, for example) and asserting a control signal responsive to a biometric evaluation of the received biometric profile.

Aspects of the present invention provide an expansible and interactive mechanism including an electrical physical locking unit in conjunction with a computer controlled management system. The system is preferably managed by central management software which may encompass a standalone configuration or a networked configuration. In the networked configuration, the central management software can be managed via the TCP/IP protocol, therefore bypassing physical restrictions or limitations to the scope of a single system. In the standalone configuration, the central management software can be engaged directly on the controlling device which is preferably located in a physically distinct, protective structure. Moreover, memory and other data can be accessed directly, either with or without a computer, while not using networking protocols.

Certain embodiments of the present invention provide a solution that provides a software platform and firmware that permits biometric solutions to be used in conjunction with conventional locks, such as those used in standard cabinet configurations. This invention provides embodiments comprising a server cabinet configuration having at least one accessible door entry panel with a biometric validation module responsive to a control signal. The control signal typically controls an electromechanical locking assembly for locking/unlocking the at least one door panel for gaining entry thereof.

Therefore, one objective of the present invention is to provide a biometric storage system and apparatus for an electrical physical locking unit, such as a cabinet. The biometrically access-controlled electrical physical locking unit may be used for both monitoring and providing access for an electrical physical locking unit. The biometrically access-controlled system provides an array of features, including, but not limited to the following that may be variously employed in embodiments of the present invention:

Biometric scanning and input employing multi-step enrollment and encryption processes versus any direct storage of biometric data;

Hardware comprising a two-part architecture in certain embodiments, interiorly located within the biometrically protected, physically locking structure or enclosure;

Hopping code encrypted communication between reader and controller;

Ability to operate in standalone or networked configurations;

Networked units operate independently from server;

Unlimited number of units, locators, and users;

Ability to provide Wiegand output and integration for entry (in compliance with security standard AC-01-1996.10 ("Access Control—Wiegand") issued by the Security Industry Association in at least one embodiment, the standard being hereby incorporated by reference as if set forth verbatim herein. Additional information regarding Wiegand devices and protocol may be found in U.S. Pat. No. 6,988,203 and U.S. Published Patent Application Nos. 2007/0046424 and 2010/0034375, the entire disclosure of each of which is hereby incorporated by reference as if set forth verbatim herein);

Sensor and alarm subsystems which may include integration with an alarm panel,

Propped door alert via detection and warning, Forced Door Alert, and Duress Entry alert using alternate biometric input (such as an alternate finger or code);

Battery backup with rechargeable sources;

Authenticated system management via software;

Management software which may be accessed only after biometric authentication thus providing multi-level biometrics;

Control system comprising a set of microchips (e.g., head and base configuration) in separate physical locations for enhanced security;

Multi-level biometric scanning including multi-layered validation requiring at least a minimum of three biometric data points for validation;

Tracking and recording of all entry events;

Monitoring multiple environmental data points (e.g., three or more) of environmental indicators of the physically secured enclosure for maintaining predetermined environmental conditions;

Biometric authentication process of biometric data prevents hacking via handheld code generators; and The system and apparatus adapted with all of the above and configured for an electrical physical locking unit such as a cabinet device.

In the description herein, numerous specific details are provided, such as examples of components and/or methods, to provide a thorough understanding of embodiments of the present invention. One skilled in the art will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

Aspects of the present invention provide a biometric security system and apparatus comprising a physical locking system, method, and computer controlled access and management of a physical locking storage unit. Certain aspects of the present invention offer the benefits of biometric security to existing enclosure systems while permitting preservation of most aspects of the existing enclosure designs, such as for example, a server cabinet.

It is to be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods and procedures described herein.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
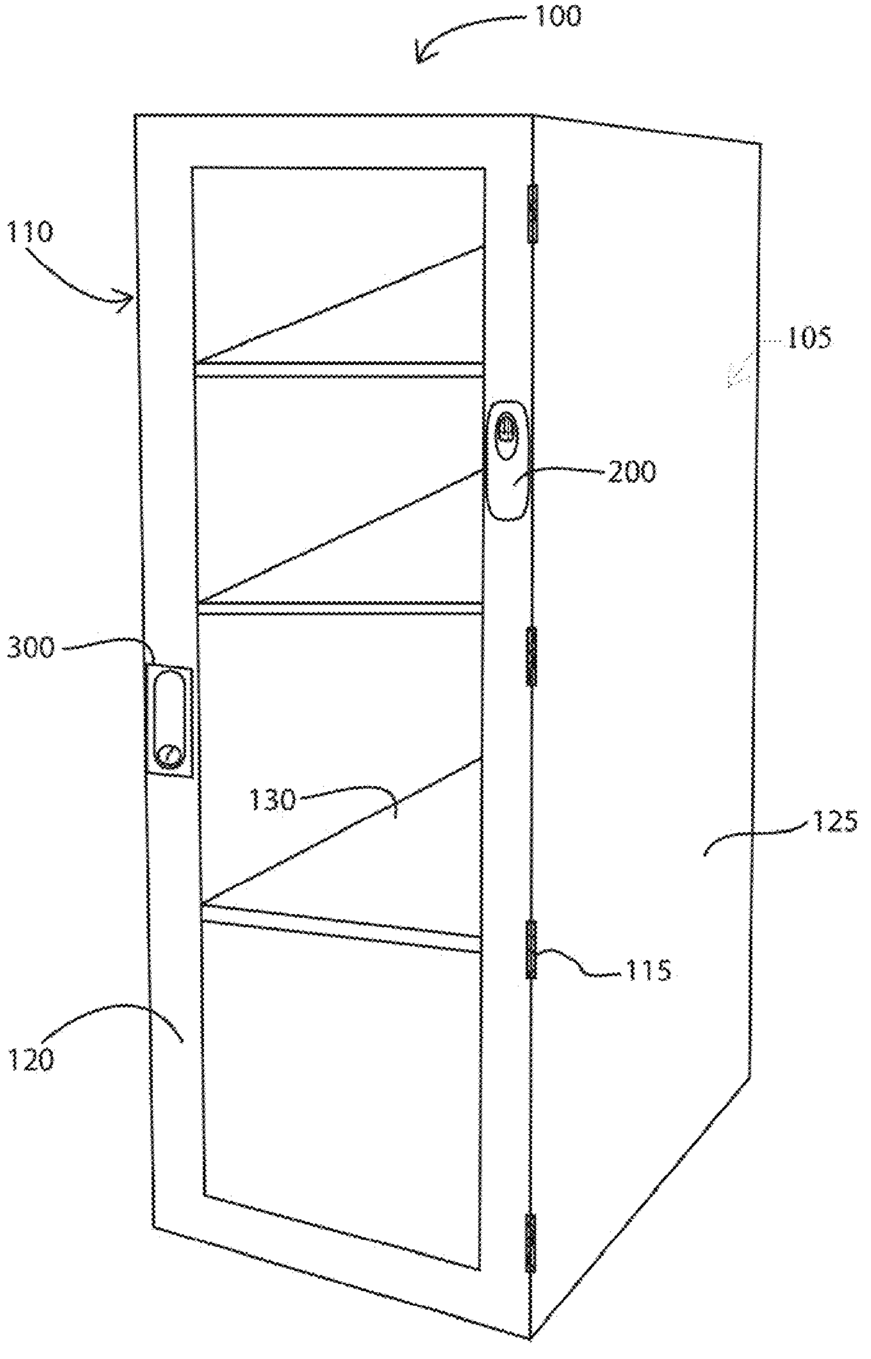
FIG. 1 is a perspective view of a biometric security system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
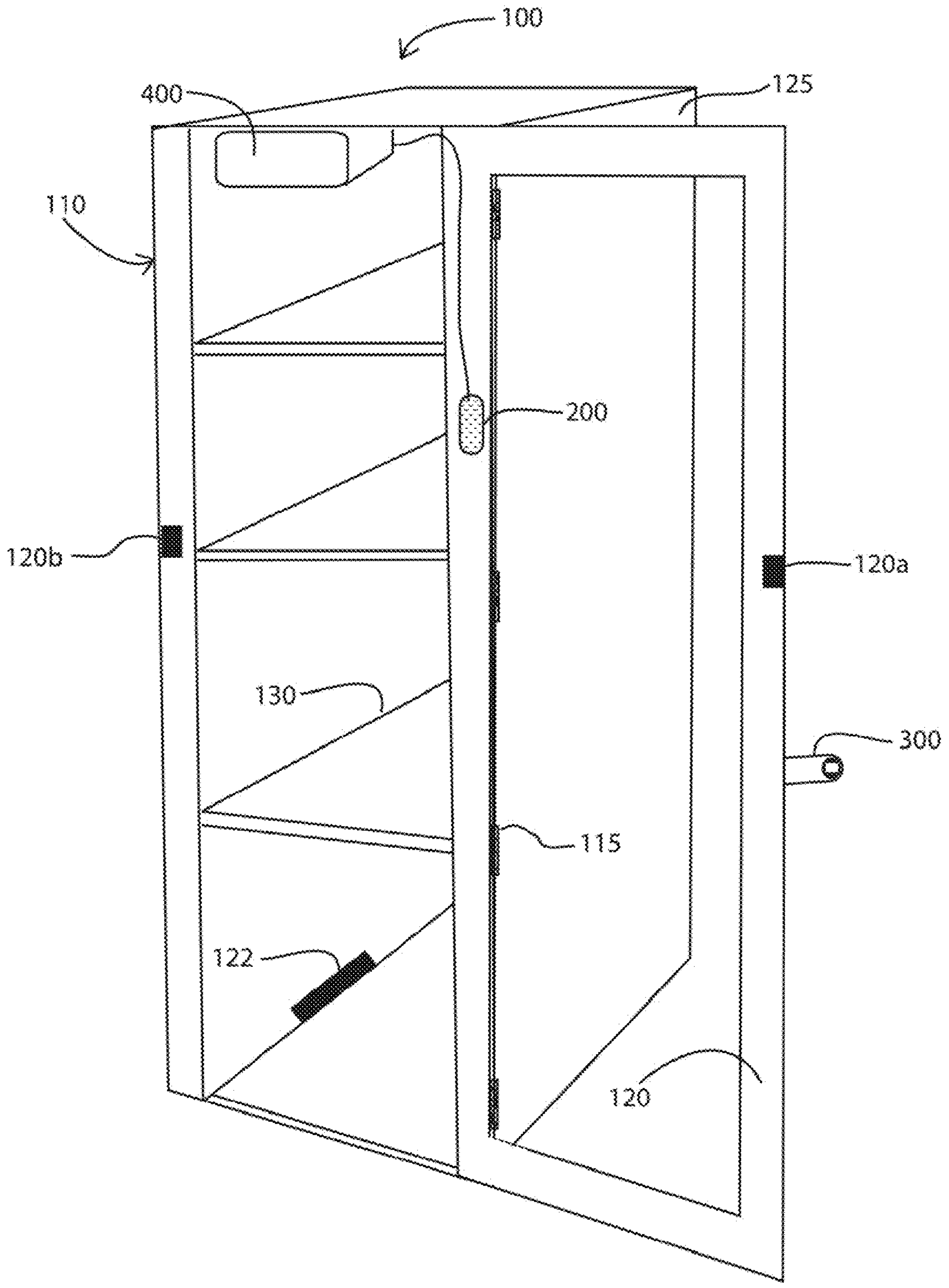
FIG. 2 is a perspective view of a physical locking storage unit of the biometric security system of FIG. 1 in an accessed and open position.

FIGS. 1 and 2 are perspective views of a biometric security system 100 comprising a physical locking storage unit 110 in accordance with an embodiment of the present invention. FIGS. 1 and 2 illustrate physical locking storage unit 110 in a closed position and an open position, respectively. Examples of suitable enclosures that may be used as physical locking storage unit 110 include the server cabinets, racks, and other data center products offered by American Power Conversion ("APC") Corporation of West Kingston, R.I., including the enclosures marketed by APC under the NETSHELTER mark. Those of ordinary skill in the art should appreciate that the embodiments of the present invention described herein may be applied to other physical locking storage units, cabinets, racks, and other enclosures exhibiting various shapes, sizes, and configurations without departing from the scope of the present invention. For purposes of the ensuing explanation, though, physical locking storage unit 110 is described with reference to a server cabinet and is, therefore, referred to as "cabinet 110."

Referring to FIGS. 1 and 2, cabinet 110 comprises a biometric scanning device 200, an electromechanical locking mechanism 300, and a controller 400, which is operatively connected to both device 200 and mechanism 300. In the presently-described embodiment, cabinet 110 comprises a housing frame 105 with at least one door 120 that comprises electromechanical locking mechanism 300. Cabinet 110 may also include another door at the rear of the cabinet opposite of door 120. It should be understood that the other door may also include an electromechanical locking mechanism and that the locking mechanisms allow the respective door to be locked in a closed position.

In the current embodiment, biometric scanning device 200 may be any suitable device configured to receive biometric information from a user, such as a fingerprint or retinal scanner. In one embodiment, for example, biometric scanning device 200 may be any fingerprint scanner capable of communicating with a microprocessor over a universal asynchronous receiver/transmitter ("UART") interface. The fingerprint scanner should also be able to receive fingerprint templates from the microprocessor and store them in its own internal memory at an index and subindex specified by the microprocessor. The fingerprint scanner should also have the ability to scan a live fingerprint, compare it with each of the stored fingerprint templates, and transmit an identification of any match, along with the associated index and subindex numbers, to the microprocessor upon a successful match. An example of a suitable fingerprint scanner is the SFM3050-TC1 fingerprint scanner offered by Suprema Inc. of Gyeonggi, South Korea, although other suitable fingerprint scanners may be used without departing from the scope of the present invention.

Electromechanical locking mechanism 300 may be any suitable electromechanical locking device configured to connect to cabinet 110 in a manner that allows the locking mechanism to secure the cabinet in a closed and locked configuration. An example of a suitable electromechanical locking mechanism is the H3-EM Lock offered by SouthCo, Inc. of Concordville, Pa.

In the presently-described embodiment, door 120 also comprises biometric scanning device 200, although it should be understood that device 200 may be located elsewhere on housing frame 105 as convenience and access necessitate. A pair of opposing side panels 125 defines the sides of housing frame 105. It should be understood that the top and bottom surfaces of housing frame 105 may also be defined by a pair of opposing removable panels. A plurality of hinges 115 connects door 120 to one of side panels 125, thereby allowing the door to rotate from a closed position, as illustrated in FIG. 1, to an open position, as illustrated in FIG. 2. Cabinet 110 may also comprise one or more shelves 130 within housing frame 105 configured to support computer and other equipment placed inside the cabinet. Door 120 or portions or panels thereof may be comprised of transparent material which allows users to see through to any items on shelves 130.

In the current embodiment, biometric security system 100 comprises various types of sensors configured to monitor different conditions both internal and external to cabinet 110. For example, cabinet 110 may comprise one or more pairs of contact sensors to determine if any of the cabinet's panels are removed or any of its doors are opened. In one embodiment, for example, a pair of contact sensors 120*a* and 120*b* are connected to housing frame 105 and door 120, respectively. In this embodiment, contact sensors 120*a* and 120*b* are reed sensors comprising a series 10K resistor maintained in a closed position by a magnet. The reed switch opens when the magnet is moved away from the reed switch and can thus detect if the tamper circuit has been compromised either by being shorted or cut. Reed switches and tamper circuits should be understood by those of ordinary skill in the art and are therefore not described in further detail.

It should be understood that cabinet 110 may comprise any number of sensors as desired. For example, cabinet 110 may comprise a sensor 122 for obtaining environmental data, monitoring conditions, and maintaining predetermined environmental conditions within the cabinet. Thus, sensor 122 may be any suitable sensing device, such as an imager including a charge-coupled device ("CCD"), complementary metal oxide semiconductor ("CMOS"), capacitive sensor, or other sensing component. Sensor 122 may be configured to monitor certain environmental conditions, such as the temperature inside cabinet 110, or physical conditions, such as the removal of the panel to which sensor 122 is attached. In an embodiment where each of the panels of cabinet 110, such as side panels 125, are removable, for example, additional sensors similar to sensor 122 may be connected to each removable panel.

In one embodiment, biometric scanning device 200, electromechanical locking mechanism 300, and controller 400 receive power from a conventional outlet. Preferably, however, biometric scanning device 200 and/or electromechanical locking mechanism 300 are configured to receive power from controller 400 via respective power cables or by any other suitable technology, such as power of Ethernet ("PoE"). In order to maintain operation of biometric security system 100 in the event of a power failure, controller 400 may be configured to receive power from a battery backup unit or may include one or more batteries.

In some embodiments, panels of housing frame 105 may be comprised of or include a wire mesh to confine any radio frequency identification ("RFID") fields within cabinet 110 while maintaining the desired level of transparency. This is useful in embodiments of biometric security system 100 employing RFID devices. The mesh may be configured to prevent any radio frequency ("RF") transmissions on the inside of the cabinet from propagating outside the cabinet. The maximum diameter of the holes in the mesh is dictated by the frequency of the RFID field used. In another embodiment, the mesh might be replaced by a translucent coating on the glass or plastic transparent material of the door. In the alternative, a conductive film in the pattern of a mesh may be coated on the transparent surfaces of the doors, either as a thin translucent layer or as an opaque coating. Such an arrangement provides the necessary containment of the RFID fields within housing frame 105 while allowing users to see inside cabinet 110. One such example of RF communication used within the cabinet may be for determining breaches of housing frame 105, such as via panels 125, or movement of items on shelves 130, as explained in more detail below. However, other uses of RF communications may include RFID card reader devices, also as explained below.

Controller 400 may be either embedded within the interior of the cabinet as illustrated in FIG. 2, may be placed one of shelves 130 on the interior of the cabinet 110, or may be mounted to one or more racks within the cabinet. Although FIG. 2 illustrates a direct wire connection between biometric scanning device 200 and controller 400, it should be understood that the controller may be operatively coupled to the biometric scanning device by any suitable data connection means understood by those of ordinary skill in the art. Suitable connections may include a wired connection, such as an Ethernet, serial or parallel, or universal serial bus ("USB") cable, or via wireless technologies, such as wireless fidelity ("Wi-Fi"), RF, infrared or other optical technologies, or Bluetooth. Controller 400 may likewise be operatively coupled to electromechanical locking mechanism 300 by any suitable data connection means.

Figure 3:
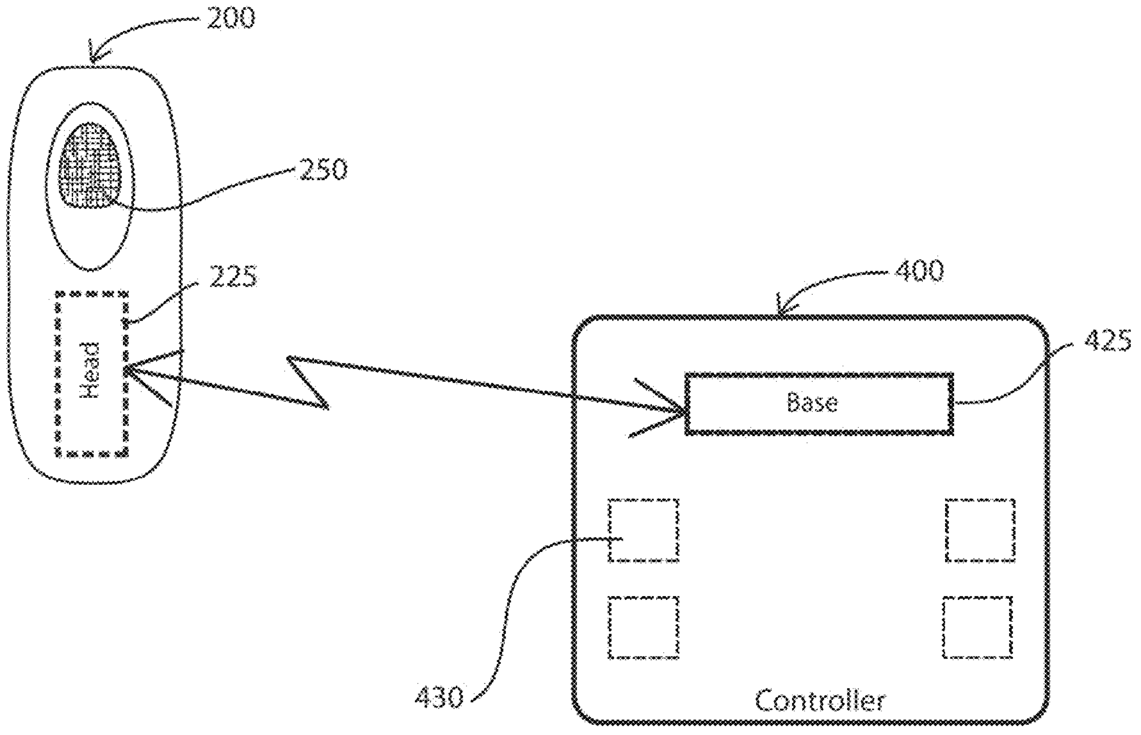
FIG. 3 is a schematic representation of a biometric scanning device and controller of the biometric security system of FIG. 1.

FIG. 3 is a schematic representation of biometric scanning mechanism 200 operatively connected to controller 400. Biometric scanning mechanism 200 comprises a biometric profile acquisition area 250. In the presently-described embodiment, biometric profile acquisition area 250 is a fingerprint reader. It should be understood, however, that other biometric profile acquisition devices, such as a retinal pattern scanner, may be incorporated into biometric scanning mechanism 200 without departing from the scope of the preset invention. It should also be understood that biometric scanning mechanism 200 may comprise additional security devices, such as an RFID reader and/or a personal identification number ("PIN") pad.

Biometric scanning mechanism 200 comprises a processing device 225 (denoted as "head"), while controller 400 comprises a processing device 425 (denoted "base"). It the current embodiment, processing devices 225 and 425 are microprocessors, although it should be understood that either may instead be a processor, controller, microcontroller, or other appropriate circuitry, such as a system on chip ("SoC"). For example, multiple electronic devices configured to operate together within either mechanism 200 or controller 400 may be considered a "processing device." Processing devices 225 and 425 are configured to transmit and receive data representative of biometric access information, as explained in more detail below. When the ensuing explanation describes data transmitted or received by biometric scanning mechanism 200 and controller 400, it should be understood that the transmission or receipt of the data is handled by processing devices 225 or 425, respectively.

Each of processing devices 225 and 425 are operatively connected to respective memories, which comprise computer-executable program code or instructions that when executed by the respective processing device perform one or more steps of the processes described in more detail below. The memory may also comprise one or more data structures for storing information. The computer-executable program code or instructions in this scenario, as should be known to those skilled in the art, usually include one or more application programs, other program modules, program data, firmware, and/or an operating system. The memory may be any type of memory or computer-readable medium, including read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, secure digital ("SD"), flash memory, memory stick, or any other medium that may be used to carry or store computer program code in the form of computer-executable programs, instructions, or data. Each of processing devices 225 and 425 may also include a portion of memory accessible only to the processing device, commonly referred to as "cache." Thus, each memory operatively connected to processing devices 225 and 425, respectively, may be part of the processing device, may be a separate component, or may be split between the relevant processing device and a separate memory device.

The computer-executable program or instruction code or software stored in the respective memory devices enables the function, fabrication, modeling, simulation, description, and/or testing of the apparatus and processes described herein and may be accomplished through the use of general programming languages (e.g., C, C++), GDSII databases, hardware description languages ("HDL") including Verilog HDL, VHDL, AHDL (Altera HDL) and so on, or other available programs, databases, and/or circuit (i.e., schematic) capture tools.

It should be understood that processing of the computer-executable program or instruction code need not be limited to a geographic location or have temporal limitations. For example, a processing device can perform the functions described herein in real time, offline, in "batch mode," etc. Portions of processing can be performed at different times, at different locations, and by different processing systems. Additionally, any signal arrows in the drawings/figures should be considered only as exemplary, and not limiting, unless otherwise specifically noted. Furthermore, any use of the term "or" as used herein is generally intended to mean "and/or" unless otherwise indicated.

In the presently-described embodiment, head and base microprocessors 225 and 425 are located in physically distinct locations from one another, and are preferably configured such that any security breaches thereof would result in complete data erasure of both microprocessors and the related memory. In one embodiment, this is accomplished by software installed on the memories operatively connected to the respective microprocessor. In another embodiment, this is accomplished by self-erasure procedures built into the respective microprocessor. For instance, each of microprocessors may be a processing device or circuitry similar to that described in U.S. Pat. No. 7,379,325, the entire disclosure of which is hereby incorporated by reference as if set forth verbatim herein. It should be understood that the transmissions between microprocessors 225 and 425 may be encrypted, and/or the microprocessors may employ a rolling or hopping code or any other encryption scheme or method as understood by those of ordinary skill in the art.

In the presently-described embodiment, controller 400 also comprises an alarm panel with an array of integrated alarm modules 430. Alarm modules 430 may include alarming mechanisms such as fire panel integration, propped door alert via detection and warning, forced door alert, and duress entry alert. Referring additionally to FIG. 2, the sensors of the storage unit, such as sensors 122, 120*a*, and 120*b* are operatively connected to alarm modules array 430 of controller 400.

Figure 4:
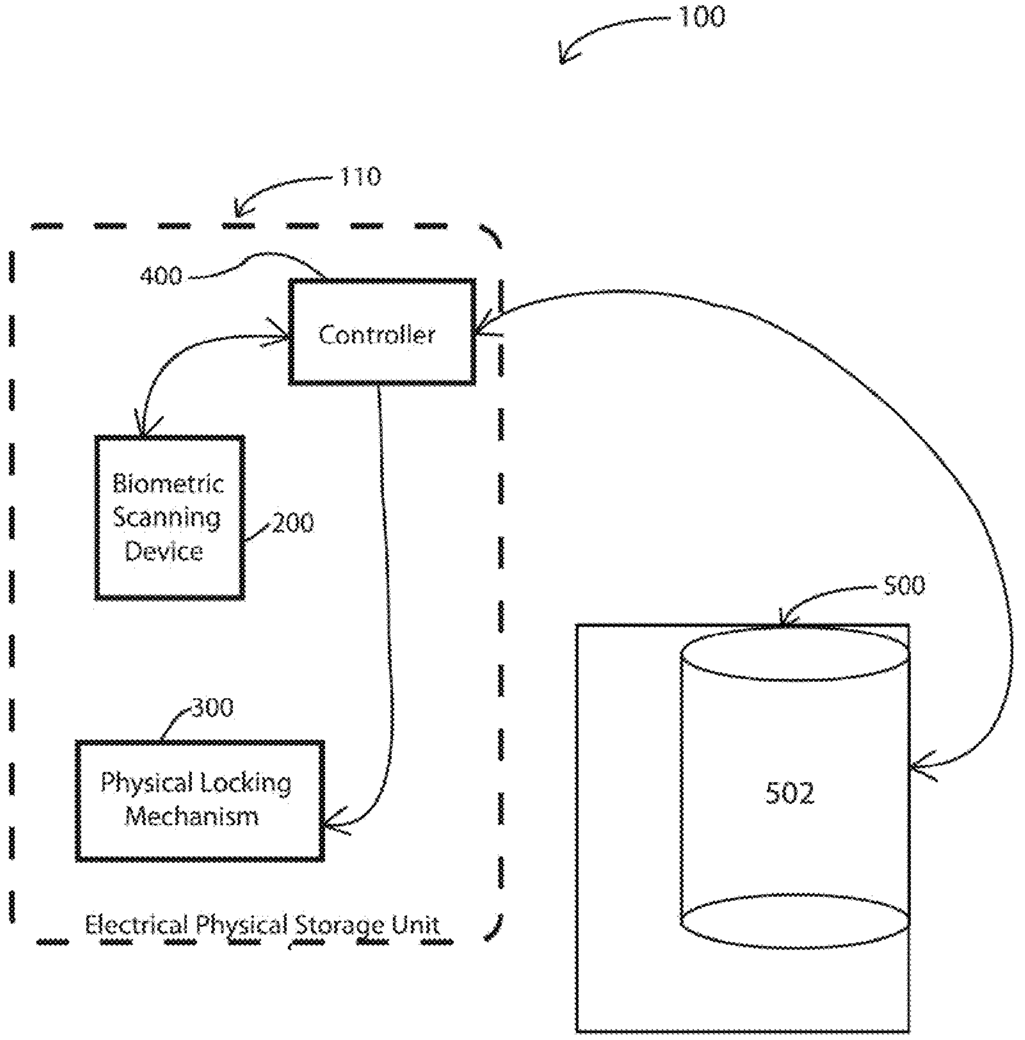
FIG. 4 is a schematic representation of a biometric security system in accordance with an embodiment of the present invention.

In one embodiment, controller 400 is configured to communicate with external devices and systems in accordance with the Wiegand standard, referenced and incorporated above. In another embodiment, controller 400 is configured to communicate with other external devices. Referring to FIG. 4, for example, biometric security system 100 additionally comprises a computer system 500 operatively connected to controller 400. Computer system 500, which comprises a database 502, may be operatively connected to controller 400 in any suitable fashion, such as the wired and wireless connections described above. As should be appreciated by those of ordinary skill in the art, computer system 500 comprises its own processing device and memory, which, in this instance, comprises database 502 configured to store biometric access information, as explained in more detail below.

In the presently-described embodiment, computer system 500 is located exterior to cabinet 110. This allows the type, size, shape, and/or configuration of computer system 500 and database 502 to be unconstrained by the design of cabinet 110. This also allows the software and hardware of computer system 500 to be easily updated or changed as software and hardware evolves, such as to account for a new or updated operating system, which may require new hardware. Keeping computer system 500 external and/or remote in comparison to cabinet 110 facilitates the ability to upgrade both software and hardware of the system. It should be understood, however, that computer system 500 may be included within cabinet 110 if desired without departing from the scope of the present invention.

Computer system 500 and database 502 provide processing features and non-volatile memory for storing data and executable instructions for implementing certain instructions, evaluations, features, and components of biometric security system 100. The data may include information regarding authorized users and the executable instructions and operating system for overall management of biometric security system 100. In this embodiment, for example, database 502 is configured to maintain data associated with the users of biometric security system 100 including biometric information for each user. That is, database 502 stores data representative of the fingerprint templates for each relevant finger of a user as described in more detail below, along with other information associated with the user. In the presently-described embodiment, computer system 500 is also equipped with a biometric scanner, which may be operatively connected to the computer system via a USB cable. The biometric scanner attached to computer system 500 is used to enroll users into biometric security system 100 as explained below. It should be understood that the biometric scanner attached to computer system 500 comprises a biometric acquisition area similar to biometric acquisition area 250 described above.

Figure 5A:
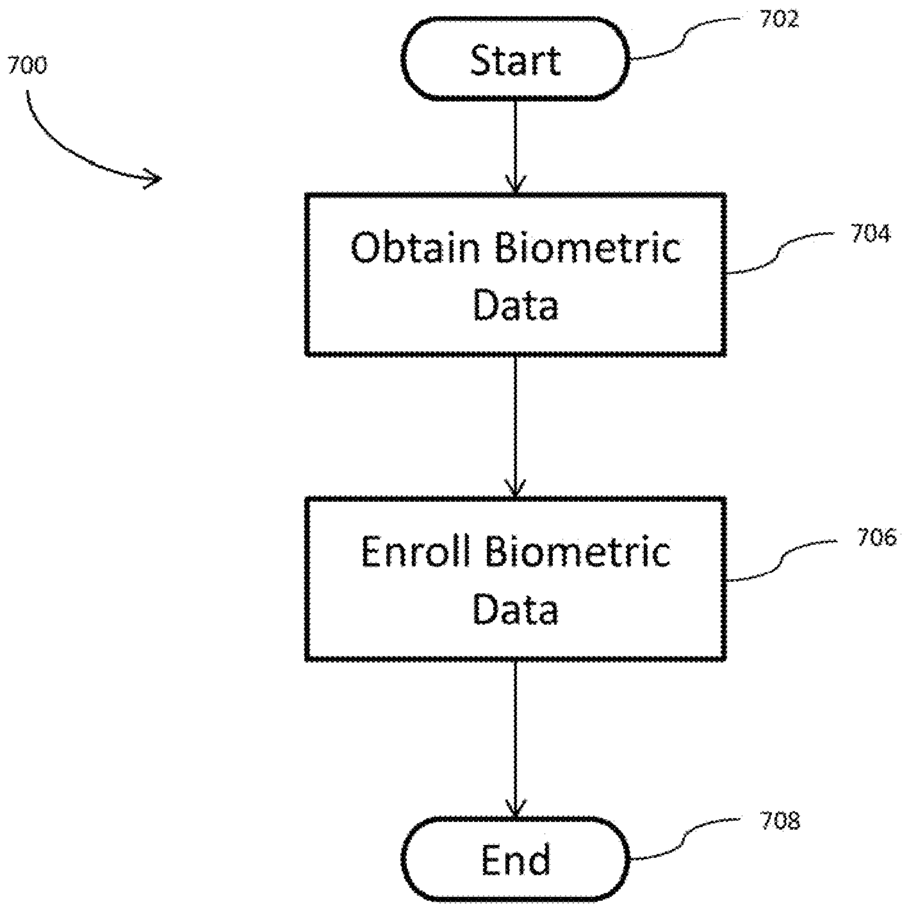
FIGS. 5A and 5B are exemplary flowcharts of processes for enrolling and using biometric information to manage access in a biometric security system in accordance with an embodiment of the present invention.
Figure 5B:
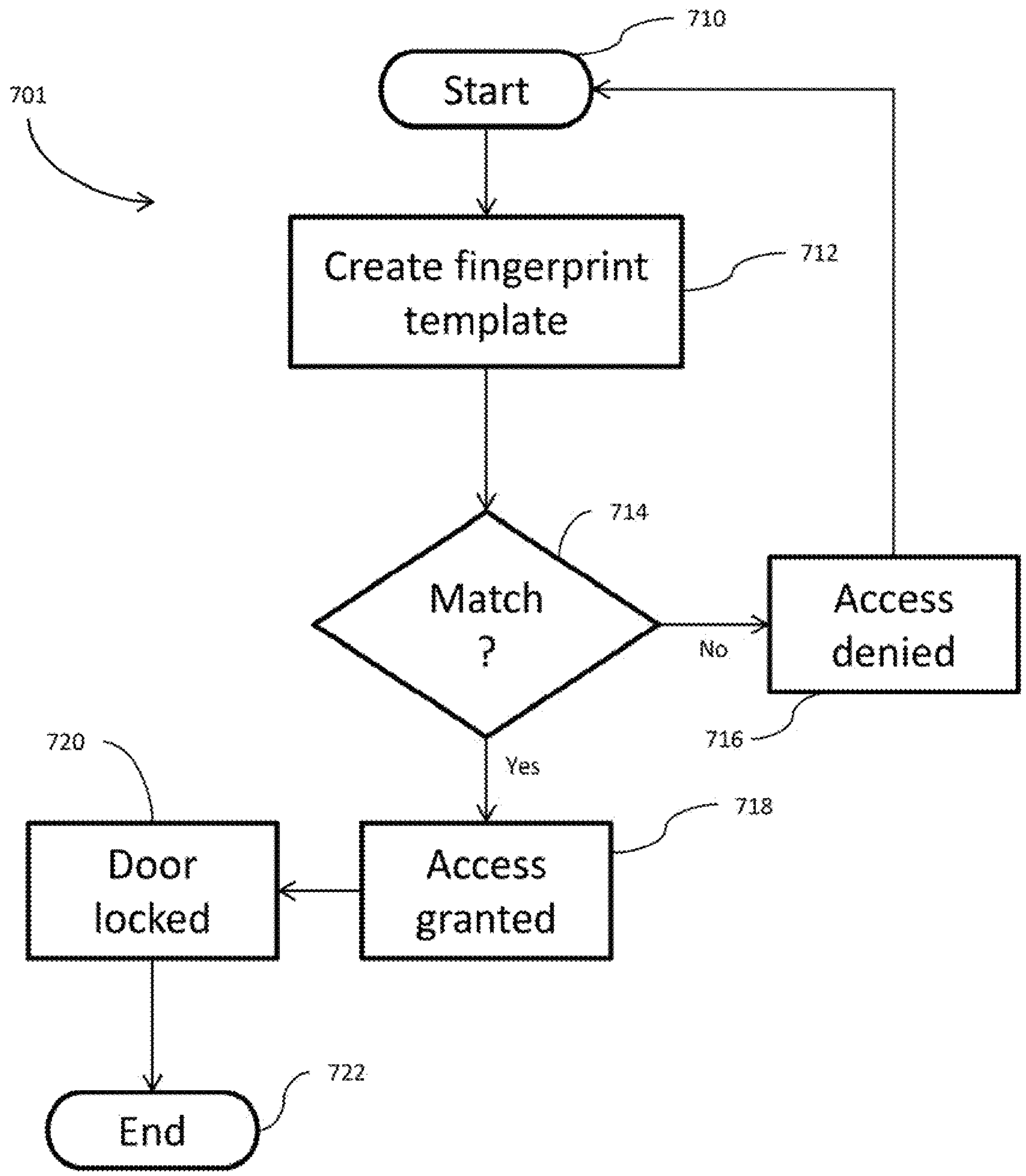
Figure 6:
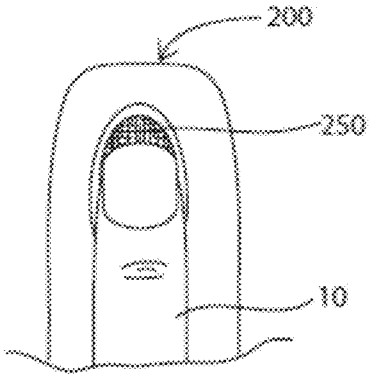
FIGS. 6 and 7 are illustrations of portions of the processes of FIGS. 5A and 5B.

FIG. 5A is an exemplary flowchart illustrating a process for creating, enrolling, and registering biometric access information for a user. The ensuing explanation of the processes illustrated in FIGS. 5A and 5B is made with reference to the devices described above with reference to FIGS. 1, 2, 3, and 4. The process starts at step 702 and then proceeds to step 704 where the biometric information for a user is obtained. In one embodiment, this is accomplished by using the biometric scanner operatively connected to computer system 500 to receive the biometric information from the user. Referring to FIG. 6, for example, the user places a finger 10 over the biometric acquisition area of the biometric scanner connected to computer system 500 in order to scan a fingerprint of the user.

Figure 7:
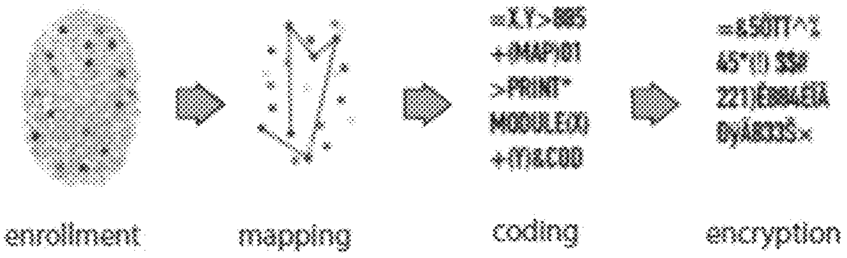

In the presently-described embodiment, the user scans his middle finger on his left hand, his index finger on his left hand, his index finger on his right hand, and his middle finger on his right hand. The biometric scanner operatively connected to computer system 500 creates a fingerprint template for each finger scanned and transmits the templates to the computer system. Computer system 500 associates the fingerprint templates with the user and stores data representative of the user, the templates, and the association of the two in database 502. It should be understood that biometric security system 100 may be configured to account for and utilize any number of fingerprints scanned from the user. For instance, computer system 500 may store a fingerprint template for each of the user's fingers in database 502 if desired. In one embodiment, computer system 500 stores in database 502 an index number associated with the user for each cabinet 110 with which the user will be associated. Alternatively, computer system 500 stores a user id for each user in database 502. FIG. 7 illustrates the process of enrollment, mapping, coding, and encryption of the data by computer system 500.

In this embodiment, computer system 500 uses the data received from the biometric scanner connected to the computer system to create a multi-point schematic of the user's biometric fingerprint profile, which the computer system associates with the user and stores as a 512-byte fingerprint template in database 502. It should be appreciated that preferred embodiments of the system do not store fingerprint images, and the biometric templates stored cannot be used to create an image of the original fingerprint.

In one embodiment, if the biometric scanner connected to computer system 500 is unable to create a fingerprint template based on the data received at step 704, the computer system may present a notification that insufficient biometric information was obtained. The process then returns to step 704 and awaits receipt of sufficient biometric information. There are various possible causes for failed registration including inconsistent finger image quality from finger imperfections, wear, or swiping too fast. It should be understood that the biometric scanning devices described herein may be adapted to measure "live" biometric data, which may include several bio-characteristics. Additionally, biometric security system 100 may require at least a minimum of three biometric data points for validation, in one embodiment.

It should be understood that any scheme or process for creating fingerprint templates from a live fingerprint by the fingerprint scanner connected to computer system 500 may be utilized as long as the fingerprint templates are recognized by biometric scanning device 200. That is, the biometric scanner operatively connected to computer system 500 should be able to create fingerprint templates from a user's fingers that will be relatively identical to the templates created by biometric scanning device 200. Those of ordinary skill in the art should understand that this will typically be the case when the manufacturer of the biometric scanning device attached to computer system 500 and the manufacturer of biometric scanning device 200 are the same. Otherwise, a standardized fingerprint template or methodology may be used to ensure consistency between the templates created by the biometric scanning devices. For instance, the Proprietary Fingerprint Template ("PFT") or PFTII standards issued by the National Institute of Standards and Technology ("NIST"), the INCITS 378 standard issued by the American National Standards Institute ("ANSI"), or the 19794-2 standard issued by the International Organization for Standardization ("ISO") may be used in order to ensure consistency between the two devices. In the presently-described embodiment, the SFR-300 fingerprint scanner offered by Suprema Inc. is used as the biometric scanner connected to computer system 500, but it should be understood that any suitable fingerprint scanner that falls within the parameters above may be used.

Once the user has scanned the fingers that are used by biometric security system 100 and the corresponding templates are stored in database 502 at step 704, process flow proceeds to step 706, where the user's biometric data is transmitted or enrolled into controller 400. That is, computer system 500 transmits data associated with a user including the fingerprint templates associated with the user to controller 400. It should be understood that the data associated with a user transmitted to controller 400 may include differing information depending on the desired configuration of biometric security system 100. In one embodiment, for example, computer system 500 includes an identification of the times during which the user is allowed to access cabinet 110 in the data transmitted. If the user is only able to access the cabinet during business hours, for instance, computer system 500 includes such an indication in the data transmitted to controller 400 and associated with the user. Depending on the configuration of the system, computer system 500 also transmits the id associated with the user, the index associated with the user and with biometric scanning device 200, or both.

When controller 400 receives the data associated with a user to be enrolled into biometric scanning device 200, it issues a clear user ("CLRUSR") command to the device instructing the device to erase any data associated with the specific index identified in the clear user command. As a result, biometric scanning device 200 erases any data previously stored in the index. Controller 400 then transmits an identification of the specific index associated with the user, as well as the fingerprint templates and the subindex into which each template should be placed, to biometric scanning device 200. Biometric scanning device 200 stores each template in the subindex of the index identified for the template. The process completes at step 708. Although the above embodiment describes enrolling four fingerprint templates per each user, it should be understood that biometric security system 100 may be configured to enroll and store fingerprint templates for as many fingers of each user as desired. It should also be understood that controller 400 stores the other information associated with the user, such as the times during which the user is allowed to access cabinet 110 received from computer system 500.

In an embodiment where computer system 500 creates and stores the index of biometric scanning device 200 associated with the user and transmits data representative of the index along with the id associated with the user to controller 400, the controller stores in its memory the index and id associated with the user. In another embodiment where computer system 500 maintains only a user id for each user and transmits data representative of the id to controller 400, the controller selects an index of biometric scanning device 200 for the user and stores in its memory the id and index associated with the user. It should be understood that controller 400 therefore maintains data sufficient to correlate the indexes of biometric scanning device 200 with user ids in order to communicate events that occur with respect to the user and cabinet 110 and transmit data representative of the event to computer system 500 as described below.

FIG. 5B is a flowchart illustrating a process 701 to manage security and access to biometric security system 100 using biometric information. The process begins at step 710, where the user passes a finger across biometric acquisition area 250. At step 712, biometric acquisition area 250 scans the finger and creates a fingerprint template from the scan. At step 714, biometric scanning device 200 determines whether the newly-created fingerprint template matches one previously stored by the biometric scanning device. If a match is not found at step 714, process flow proceeds to step 716 and the user is denied access to cabinet 110. Depending on the desired configuration of biometric security system 100, the system may present the user with a notification that access to cabinet 110 has not been granted or output an audible alert indicating the same. The process then returns to step 710 and repeats.

If a match is found at step 714, however, biometric scanning device 200 transmits data to controller 400 representative of the index and subindex of the template stored by the device that matches the newly-created template of the live user. In the presently-described embodiment, controller 400 includes control logic that loops and listens for interrupts from biometric scanning device 200. The data transmitted by biometric scanning device 200 triggers such an interrupt at controller 400 indicating that a match has been found that the controller needs to process the associated data. Controller 400 then processes the interrupt. Process flow proceeds to step 718, where controller 400 transmits a control signal to electromechanical locking mechanism 300 instructing the mechanism to unlock. Based on receipt of the control signal, electromechanical locking mechanism 300 releases or unlocks, thereby allowing the user to access the interior of cabinet 110. Those of ordinary skill in the art should understand configuring mechanical interfaces for particular mechanical interlocking systems, including moving, rotating, sliding, shifting, and other mechanics for transforming one motion to another for physical locking and access. Accordingly, those mechanics and mechanical interfaces are not discussed in more detail herein. It should be understood that controller 400 may engage in additional processing at step 718. In one embodiment, for example, controller 400 transmits data to computer system 500 representative of the user id and the timestamp that the user accessed cabinet 110. Computer system 500 may use this information to generate reports regarding access to cabinet 110 or transmit electronic messages to administrators associated with the cabinet, as described in more detail below.

In another embodiment, access to cabinet 110 is based on more than a match being found by biometric scanning device 200 between the live fingerprint template and those stored in the device's indexes. For example, biometric scanning device 200 may transmit an identification of the index and subindex of the matching fingerprint template to controller 400 in a manner similar to that described above. Controller 400 then identifies the user based on the identification of the index and subindex of the matching fingerprint template. Controller 400 then analyzes the additional data stored by the controller and associated with the user to determine whether the user may access cabinet 110. For instance, controller 400 may analyze the times associated with the user that define when the user may access the cabinet. If the current time is outside of the allowable times, process flow proceeds to step 716 where controller 400 denies access to the cabinet. In one embodiment, controller 400 performs additional processing in this scenario. For instance, controller 400 may transmit data indicating that the user attempted to access cabinet 110 outside of the allowable times associated with the user to computer system 500 for storage in database 502. The data may include an identification of the time the user attempted to access the cabinet. Computer system 500 may use this information to generate a report or transmit an electronic message to administrator associated with cabinet 110, depending on the desired configuration of biometric security system 100.

Returning to the explanation of process 701, after accessing cabinet 110, the user closes door 120 and locks cabinet 100 at step 720. This may be accomplished by the user engaging biometric profile acquisition area 250 again. It should be understood that other methods of locking configurations are contemplated, such as configuring electromechanical locking mechanism 300 to lock automatically when door 120 is closed. The process then ends at step 722.

In one embodiment, controller 400 stores data representative of a time stamp including the time and/or date of the user entry at step 718 if a match is found at step 714. Controller 400 may also store data representative of a time stamp when the user closes and locks cabinet 110 at step 720. Alternatively or in addition to storage of this data by controller 400, the controller may transmit the data to computer system 500 for storage in database 502. It should be appreciated that this allows an administrator to check which users accessed cabinet 110 and when. Additionally, reports may be generated that provide the same information.

Figure 8:
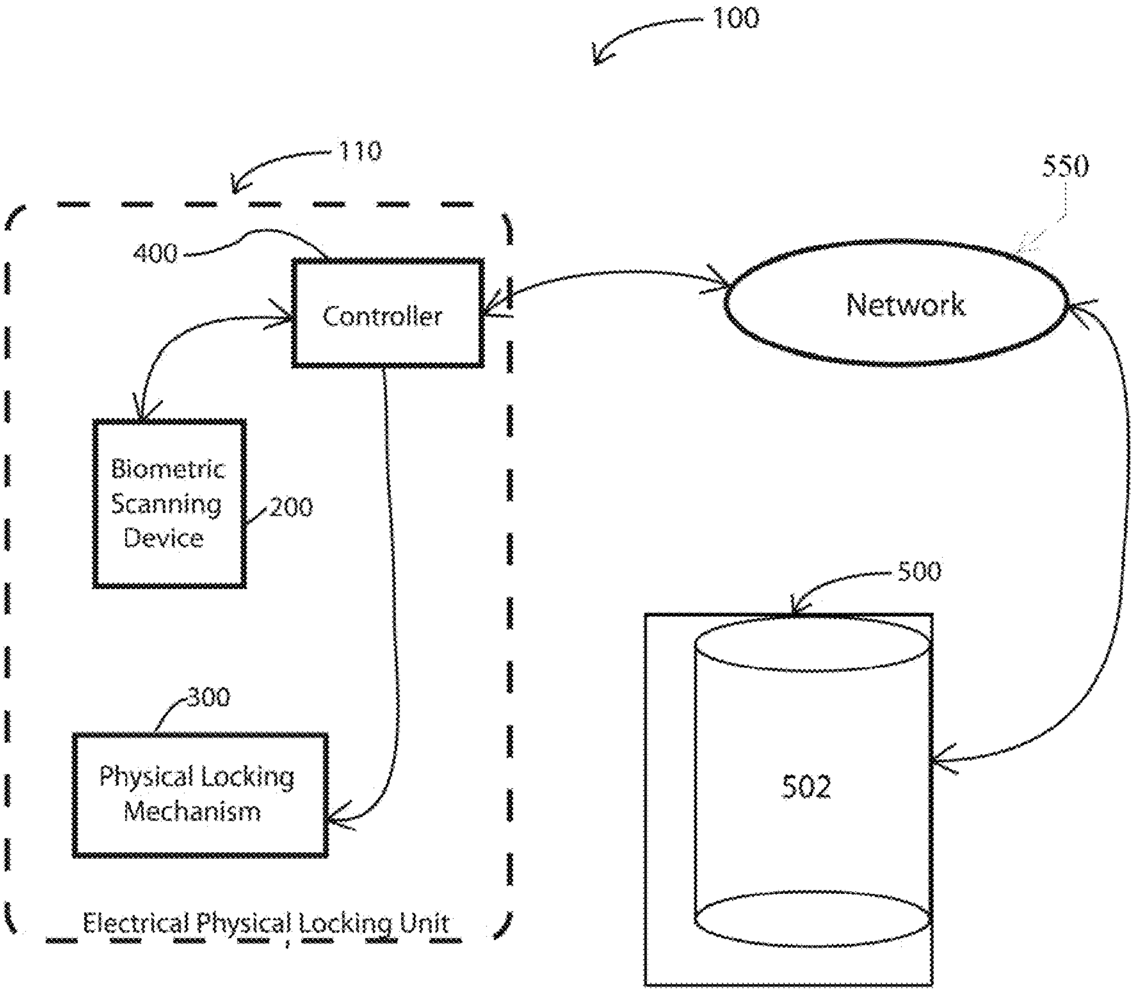
FIG. 8 is a schematic representation of a biometric security system in accordance with an embodiment of the present invention.
Figure 9:
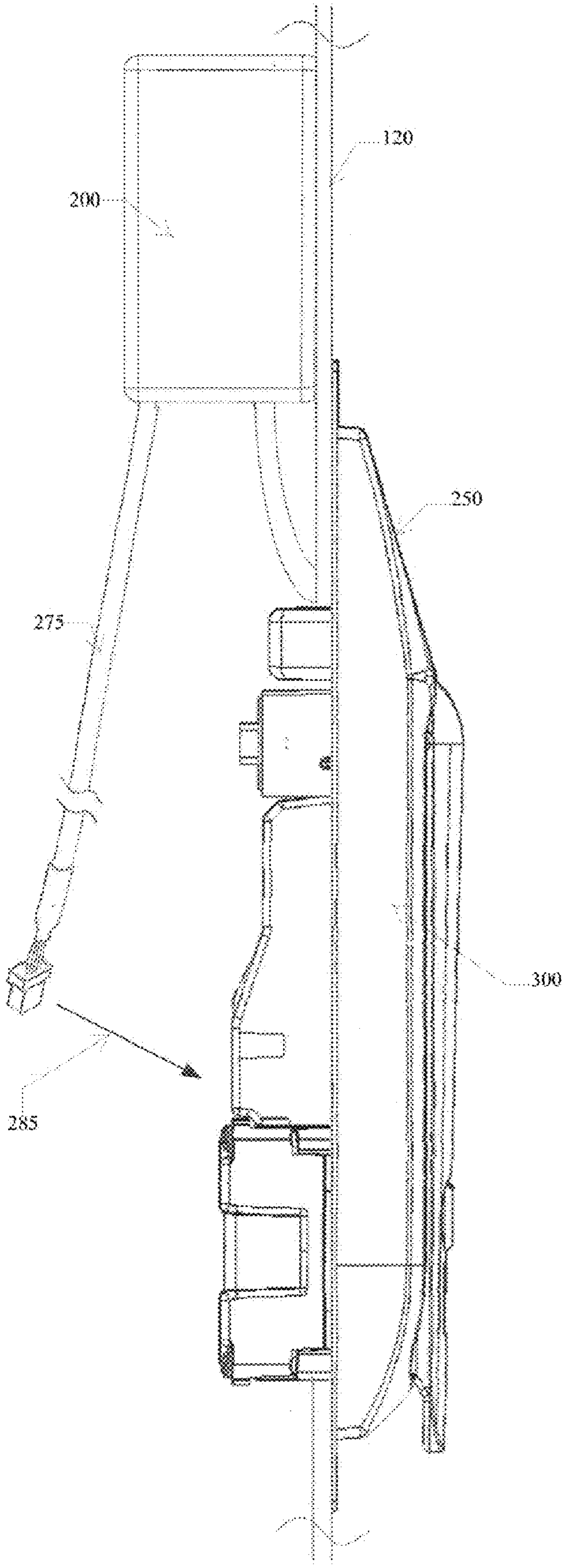
FIG. 9 is a side elevation view of a biometric scanning device and an electromechanical locking mechanism in accordance with an embodiment of the present invention.

In another embodiment, computer system 500 may be operatively connected to controller 400 via a network. Referring to FIG. 8, for example, controller 400 and computer system 500 comprise respective network adapters and are operatively connected via a network 550. It should be understood that network 550 may be a local area network ("LAN") or a wide area network ("WAN") such as the Internet. Controller 400 and computer system 500 each may be connected to network 550 in any suitable manner understood by those of ordinary skill in the art, including wired and wireless technologies. For instance, controller 400 may be connected to network 550 via a fiber optic or telephonic network, while computer system 500 may be connected to network 550 by cellular or landline technologies or any combination thereof.

In the presently-described embodiment, controller 400 transmits and receives data to and from computer system 500 using the transmission control protocol ("TCP") and internet protocol ("IP") as should be understood by those of ordinary skill in the art. As a result, security administrators of biometric security system 100 may enroll users in the system or generate reports using the system from any location operatively connected to network 550. For example, data associated with users enrolled and stored in computer system 500 may be used to manage access of the users to enclosures at other locations operatively connected to network 550.

In one embodiment, controller 400 and computer system 500 are configured to encrypt and decrypt transmissions between the two. In one embodiment, the transmissions between controller 400 and computer system 500 are encrypted using the extended Tiny Encryption Algorithm (XTEA).

In the presently-described embodiment, the encryption scheme used by controller 400 and computer 500 utilizes at least a private key and a session key in a rolling key or hopping code methodology. The private key is stored in the memory of both controller 400 and computer system 500, while a different session key is created each time the controller and the computer system communicate. For example, computer system 500 transmits a command to controller 400 indicating the computer system desires to communicate. In response to the command, controller 400 creates a session key based on random seed data, encrypts the session key using the private key, and transmits the session key to computer system 500. Upon receipt of the encrypted data, computer system 500 uses the private key to decrypt the data that includes the session key, encrypts the command or other information computer system 500 desires to transmit to controller 400 using the session key, and transmits the encrypted data to the controller. Controller 400, likewise, decrypts the data using the session key and generates a new session key. When controller 400 transmits data to computer system 500 acknowledging receipt of the data transmitted by the computer system, it attaches the new session key to the data. Before transmitting the data to computer system 500, controller 400 encrypts it using the old session key. Upon receipt of the encrypted data from controller 400, computer system 500 decrypts the data containing the acknowledgement, as well as the new session key, using the old session key and stores the new session key in memory. Computer system 500 then encrypts data using the new session key the next time it transmits data to controller 400. The process then repeats each time computer system 500 and controller 400 communicate.

As noted above, the sensors of biometric security system 100 may be configured to monitor conditions of cabinet 110 and transmit or vary output signals based thereon. Referring again to FIGS. 2 and 3, for instance, one of sensors 122 may output or vary its signal when the temperature within cabinet 110 rises above or falls below a predefined threshold. Controller 400 monitors the signals received from the sensors via alarm modules array 430 and generates an alarm condition upon the occurrence of certain conditions. For instance, when the temperature within cabinet 110 rises above the predefined threshold, controller 400 is configured to generate an alarm condition.

As should be appreciated by those of ordinary skill in the art, biometric security system 100 may be configured to handle alarm conditions in various ways, which may be based on the system's configuration and/or upon the specific alarm condition. In one embodiment, for instance, biometric security system 100 may simply be configured to transmit a signal or data to a third-party device indicating that an alarm condition has been generated without any further processing by system 100.

In other embodiments, however, biometric security system 100 may be configured to handle alarm conditions differently. For instance, cabinet 110 may comprise a speaker through which biometric security system 100 outputs an audible alert when an alarm condition occurs. As a result, any nearby administrator responsible for the cabinet's integrity may be alerted by the audible alarm. In another embodiment, biometric security system 100 transmits an indication of the alarm condition to one or more users that are tasked with management of cabinet 110. It should be understood that this may be accomplished via network 550 by either controller 400 or computer system 500. It yet another embodiment, biometric security system 100 is configured to output both an audible alert at cabinet 110 and concurrently transmit an electronic notification to the appropriate personnel.

Biometric security system 100 may be configured to generate other alarm conditions based on certain criteria. In an embodiment where contact sensors 120*a* and 120*b* are reed sensors, for example, sensors 120*a* and 120*b* transmit a +2.5V signal under normal conditions. The signal changes to +5V if the signal wire is cut or 0V if the corresponding tamper switch is bypassed or shorted out. Either change in the signal's voltage indicates a change in the sensor's condition. Thus, the change occurs in this example at least when door 120 is opened. In one embodiment, this causes controller 400 to issue an alarm condition, but, in another embodiment, biometric security system 100 analyzes other characteristics to determine whether an alarm condition has been met. For example, if biometric security system 100 has not authorized a user to open door 120, receipt of the signal or change in the signal from sensors 120*a* and 120*b* indicates that an unauthorized breach of cabinet 110 has occurred. At this point, controller 400 generates an alarm condition, which biometric security system 100 handles depending on the desired configuration of the system. On the other hand, if biometric security system 100 has recently authorized a user to access cabinet 110 and thus instructs electromechanical locking mechanism 300 to unlock, controller 400 may disregard the change in the signal from contact sensors 120*a* and 120*b* in this scenario or may use it for other reasons. In one embodiment, controller 400 ignores the change in the signal altogether. In another embodiment, however, controller 400 initiates a counter or timer based on the change in the signal. The counter or timer represents the amount of time that door 120 has been opened. If the counter reaches a predefined limit, it indicates door 120 has been propped open or was improperly or unsuccessfully closed. As a result, biometric security system 100 generates an alarm condition when the counter reaches the predefined limit.

It should be appreciated that alarm conditions may be generated based on the occurrence of other conditions. For instance, in an embodiment where cabinet 110 comprises a fire alarm or smoke detector, biometric security system 100 may be configured to generate an alarm condition when a signal from the fire alarm or smoke detector indicates that it has detected fire or smoke, respectively. Similarly, biometric security system 100 may be configured to generate an alarm condition when sensors attached to removable panels of cabinet 110 output or vary a signal indicating the respective panel has been removed.

In another embodiment, biometric security system 100 is configured to identify one of a user's fingers as an emergency of duress finger. When the user presents this finger to biometric security system 100, the system generates an alarm condition. In this embodiment, biometric security system 100 identifies a specific finger as an emergency or duress finger for each user during the enrollment process. Computer system 500 generates a fingerprint template for that finger in the manner described above but identifies the fingerprint template as being associated with a duress finger when the data is stored in database 502. When computer system 500 transmits data associated with a user to controller 400, the data identifies which fingerprint templates are associated with duress fingers for the user. Controller 400 instructs biometric scanning device 200 to store the fingerprint templates in the index and subindexes associated with the user as described above. However, controller 400 stores in its memory an identification of which subindexes contain the fingerprint template(s) associated with the duress finger(s).

When the user later scans a finger identified as a duress finger using biometric scanning device 200, a fingerprint template is created for the finger in order to attempt to match it to data associated with a user stored by the system in the manner described above. When the match occurs, biometric scanning device 200 transmits the index and subindex of the matched template. Controller 400 determines that the matched fingerprint template is associated with an emergency or duress finger based on the subindex. This indicates that the user is in danger, is opening cabinet 110 under duress, or is being otherwise forced to open the cabinet. Biometric security system 100 generates an alarm condition accordingly.

It should be appreciated that biometric security system 100 may be configured to handle such a situation in various ways. For the safety of the user under duress, for example, biometric security system 100 may be configured to unlock electromechanical locking mechanism 300 while not generating any noticeable alerts. Biometric security system 100, however, may trigger a silent alarm notifying nearby authorities.

In another embodiment where cabinet 110 comprises a second locking door at the rear of the unit, biometric security system 100 may be configured to handle access of the second door. In such an embodiment, the second door comprises its own electromechanical locking mechanism operatively connected to controller 400, similar to electromechanical locking mechanism 300 described above. Each user having access to the rear door is enrolled to controller 400 in a manner similar to that described above. In this embodiment, however, controller 400 stores data associated with the user identifying which door the user may access.

The user scans a finger using biometric scanning device 200. Biometric security system 100 determines whether a fingerprint template created from the scan matches a template previously stored by the system during the enrollment process described above. Controller 400 uses the data prescribed by biometric scanning device 200 representative of a match to identify the user. The data stored by controller 400 for a user indicates whether the user is allowed access to the second door. If so, controller 400 transmits a control signal to the electromechanical locking mechanism associated with the front door, the electromechanical locking mechanism associated with the rear door, or both depending on the desired configuration of biometric security system 100.

In another embodiment, the second door is associated with its own biometric scanning device. The biometric scanning device is operatively connected to controller 400 and operates in a manner similar to biometric scanning device 200 as described above. In this embodiment, the user is enrolled to the second biometric scanning device in a manner similar to that described above. When the user scans a finger, the biometric scanning device associated with the second door determines if the scan matches a template stored by the device. If so, controller 400 determines whether the user may access the second door. If so, controller 400 transmits a control signal to the electromechanical locking mechanism associated with the second door instructing the mechanism to open or release. It should be understood that the presently-described embodiment allows biometric security system 100 to independently control access of each door or any other lockable portion of the storage unit.

Thus, it should be understood that biometric security system 100 may be configured to provide access to all or portions of the associated physical locking storage unit based on the templates associated with users as stored in database 502 of computer system 500 and enrolled to controller 400. For example, there may be governmental/regulatory requirements regarding access to certain contents in cabinets, such as cabinet 110 (FIGS. 1 and 2). Also, certain employees for a company may have varying levels of access to the interior of cabinet 110 and/or certain items stored on shelves 130 therein.

Furthermore, biometric security system 100 may allow certain users to remove items from cabinet 110. Referring again to FIG. 2, for example, sensors within unit 100, such as sensor 122 may be configured to transmit data to controller 400 indicative of when an item has been removed from a corresponding shelf 130. In certain instances, removal of an item can be accompanied by an indication thereof by way of a sound and/or visual indication as well as a system alert after the item is removed. In some instances, there may be times when the item removed from the cabinet cannot be returned to the cabinet without additional processing. For example, some regulated items may not be returned to the cabinet by the user without additional authorization and verification, which may also be handled by computer system 500 of biometric security system 100. Also, some items may have a limited, out-of-cabinet life, and some verification that the item was not exposed to an adverse environment may be required before returning the items to the cabinet.

In an embodiment where the controller comprises one or more alarm modules, the alarm modules may be configured to output an alarm in the event that the user that accessed the storage unit did not have permission to remove the item. Referring to FIGS. 2 and 3, for instance, sensor 122 may be configured to transmit data to controller 400 when an item is removed from the corresponding shelf 130, as described above. Biometric security system 100 analyzes the data associated with the user which it retrieved when the user was authenticated and allowed access to cabinet 110. If an analysis of the data reveals that the user is not associated with rights that allow the user to remove the item, controller 400 generates an alarm condition. Biometric security system 100 handles the alarm condition in accordance with the explanation above.

In an embodiment where biometric scanning device 200 comprises additional components, such as the RFID reader and PIN pad mentioned above, biometric security system 100 may use data received from these devices to manage access to the respective storage unit. For example, during the enrollment process described above, the user may present an RFID tag or card to the RFID reader, a PIN via the PIN pad, or both. For purposes of simplicity, the RFID tag or card is referred to herein as a "proximity card" in the following description. Computer system 500 stores the additional security information for each user in database 502. Computer system 500 transmits the additional security information to controller 400 when the fingerprint templates for the user are transmitted. Controller 400 stores the additional security information associated with the user in its memory.

In order to access the storage unit, the user provides biometric information to biometric scanning device 200 as well as a proximity card and/or a PIN depending on the desired configuration of the system. For instance, the user may be required to provide the proximity card and/or PIN for validation prior to providing the biometric information or vice versa.

Regardless of the particular sequence employed by biometric security system 100 in analyzing the additional security information in combination with the biometric information, the system determines whether the user has rights to access the relevant storage unit based on a comparison of the received information with data previously stored by controller 400. If there is a match, biometric security system 100 provides the user with access to the storage unit in a manner similar to that described above. Otherwise, biometric security system 100 prohibits the user from accessing the storage unit.

In another embodiment, biometric acquisition area 250 of biometric scanning device 200 is integrated into electromechanical locking mechanism 300. Referring to FIGS. 9 through 13, for example, biometric acquisition area 250 in this embodiment is located at the top of electromechanical locking mechanism 300. In this embodiment, biometric scanning device 200 is operatively connected to electromechanical locking mechanism 300 via a control line 275. Control line 275 is connected to electromechanical locking mechanism 300 as denoted by arrow 285.

In the current embodiment, biometric scanning device 200 comprises biometric acquisition area 250, as well as circuitry configured to transmit control signals to electromechanical locking mechanism 300. In the presently-described embodiment, the portion of biometric scanning device 200 comprising biometric acquisition area 250 and configured to receive biometric information from a user may be any suitable fingerprint scanner, such as the SFM3050-TC1 identified above. Those of ordinary skill in the art should appreciate that such fingerprint scanners normally operate at transistor-transistor logic ("TTL") voltages, which limits the distance biometric acquisition area 250 may be separated from the remainder of biometric scanning device 200. Accordingly, biometric acquisition area 250 is configured to communicate via an RS232 serial interface in order to extend this distance.

Figures 10A, 10B:
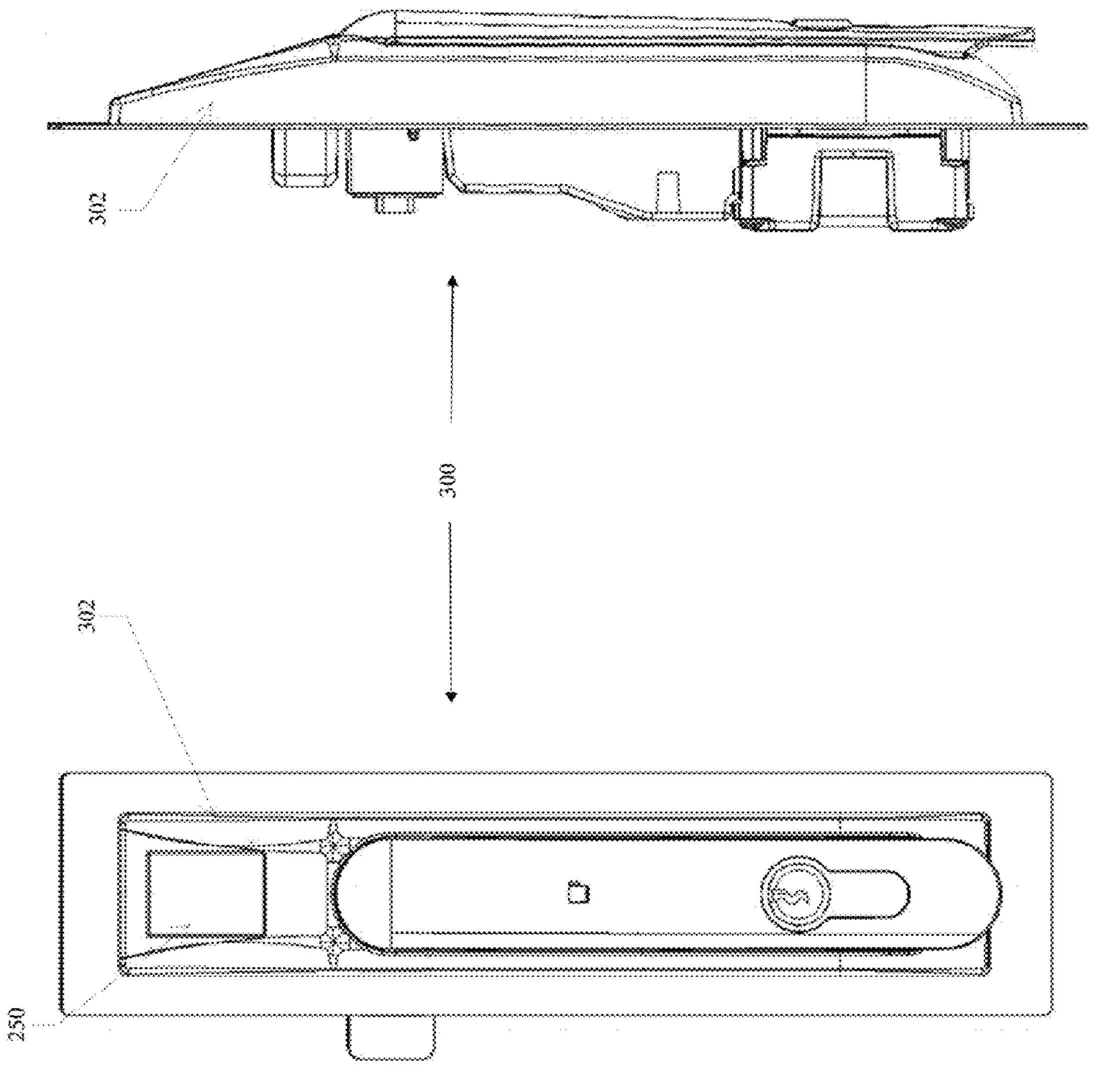
FIGS. 10A and 10B are front and side elevation views of the electromechanical locking mechanism of FIG. 9.

It should be understood that any suitable electromechanical locking mechanism having the ability to receive a fingerprint scanner may be used in the current embodiment, such as the H3-EM electromechanical locking mechanism referenced above. Those of ordinary skill in the art should also appreciate that the portion of the electromechanical locking mechanism selected external to the server cabinet may need to be altered in order to sufficiently support the fingerprint reader to prevent breakage or separation of the two. Referring to FIGS. 10A and 10B, for instance, a top portion 302 of electromechanical locking mechanism 300 is extended in order to receive biometric acquisition area 250. It should be understood that the extension of area 302 does not otherwise alter the configuration or operation of electromechanical locking mechanism 300.

Figure 12:
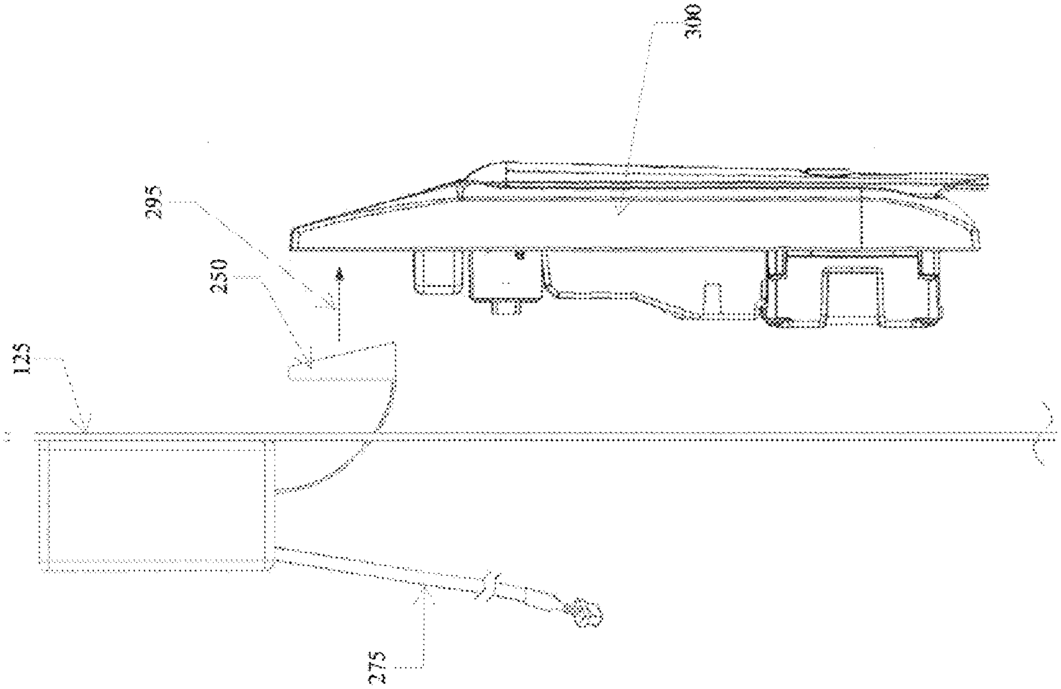
FIGS. 11 and 12 are perspective and side views, respectively, of the biometric scanning device and electromechanical locking mechanism of FIG. 9.
Figure 11:
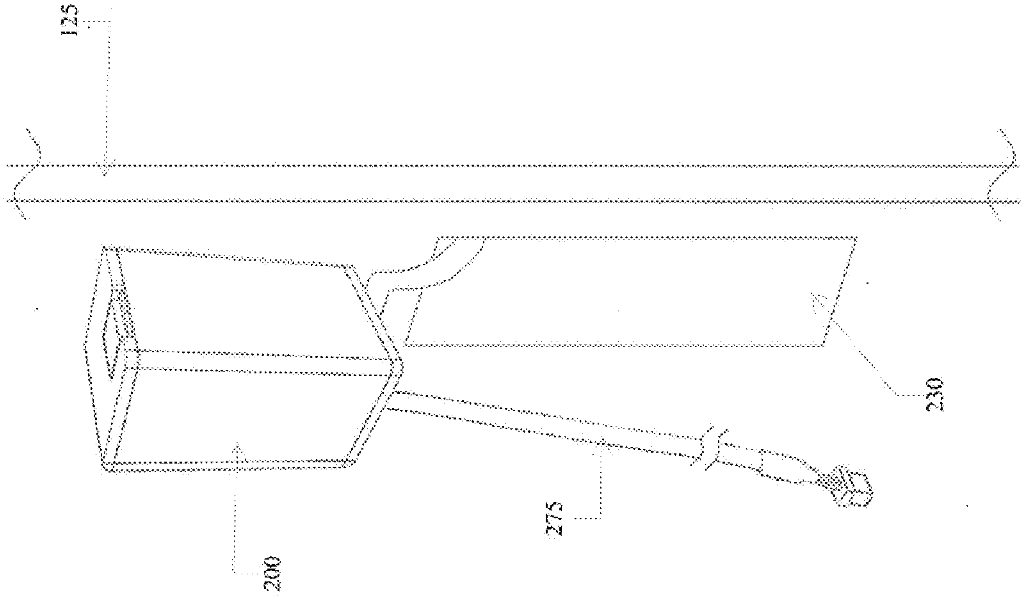
Figure 13:
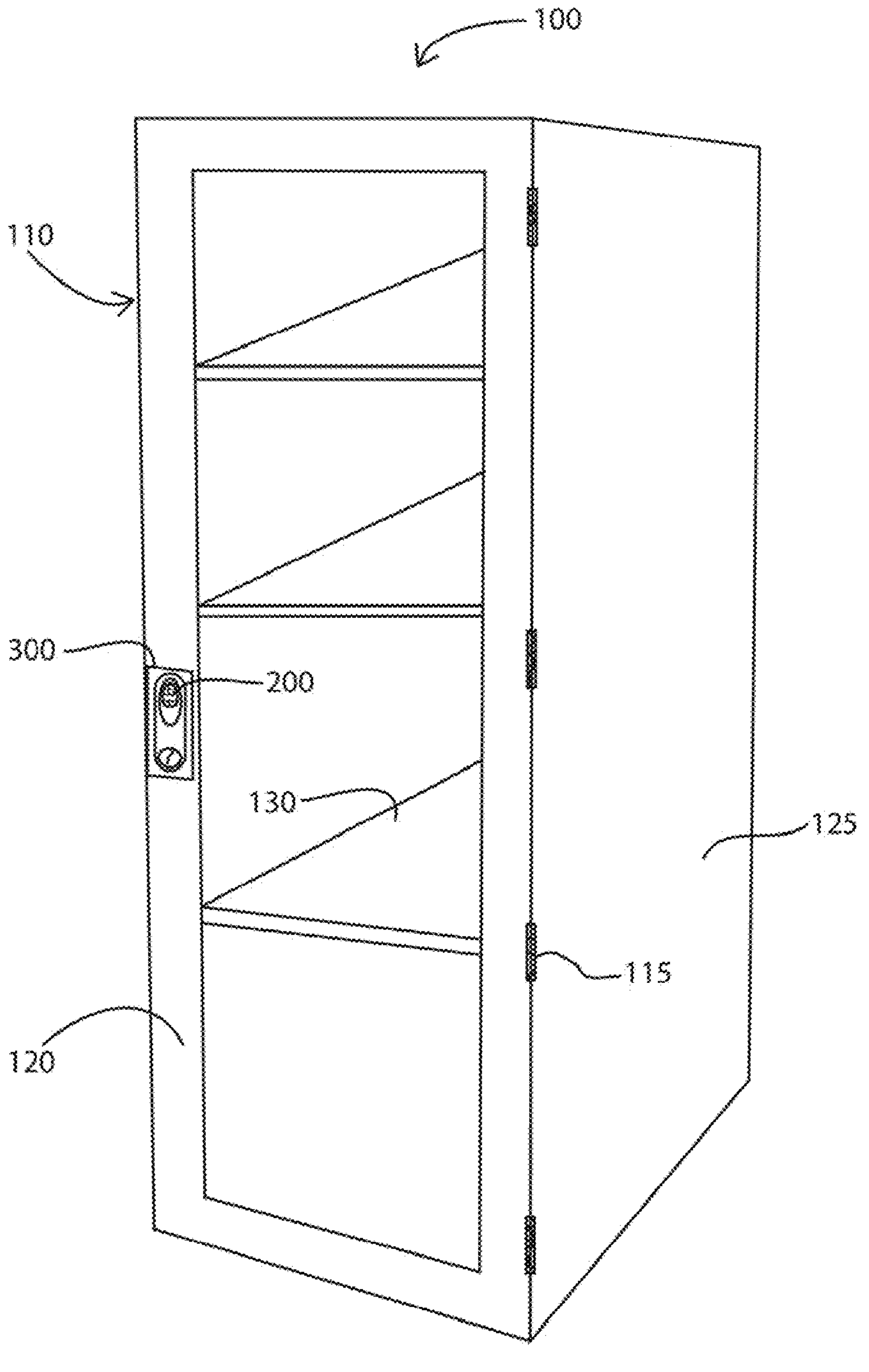
FIG. 13 is a perspective view of a biometric security system in accordance with an embodiment of the present invention.

FIGS. 11 and 12 illustrate an exemplary process of integrating biometric acquisition area 250 into locking mechanism 300. In the presently-described embodiment, biometric scanning device 200 is adhered to an inside portion of door 120 just above an aperture 230 defined by the door. As should be understood by those of ordinary skill in the art, a portion of a locking mechanism is passed through an aperture defined in a door of a server cabinet in order to provide the ability to lock the door in a closed position. In this embodiment, biometric acquisition area 250 of biometric scanning device 200 is passed through aperture 230 from within cabinet 110 to the cabinet's exterior. Biometric acquisition area 250 is inserted into the top portion of electromechanical locking mechanism 300 as denoted by arrow 295. The locking portion of electromechanical locking mechanism 300 is then passed through aperture 230 and secured in place. FIG. 13 is a perspective view of biometric security system 100 comprising a cabinet 110, where biometric acquisition area 250 of biometric scanning device 200 is integrated into electromechanical locking mechanism 300.

In the current embodiment, biometric scanning device 200 may receive power from controller 400 via PoE and in a manner similar to that described above. In this embodiment, biometric scanning device 200 provides power to electromechanical locking mechanism 300 via control line 275. Biometric scanning device 200 also transmits the control signal from controller 400 to instruct electromechanical locking mechanism 300 to lock or unlock via control line 275. Otherwise, biometric scanning device 200, electromechanical locking mechanism 300, and controller 400 operate in a manner similar to that described above.

Those of ordinary skill in the art should appreciate that biometric security system 100 may be configured to be retrofitted into existing physical locking storage units, cabinets, and enclosures that currently use an electromechanical or mechanical lock and key system in order to control access to the respective unit, cabinet, or enclosure via biometric control. This is because the locking mechanism may be replaced with electromechanical locking mechanism 300 incorporating biometric acquisition area 250 described above without altering the respective storage unit, cabinet, or enclosure. Other embodiments may provide for changes to any preexisting mechanical interface and may adapt an aperture, or physically locking mechanism previously used as a keyed locking assembly, for biometric control and access.

It should be understood that the above description discloses the integration of a high level of security into physically locking storage units, using real-time monitoring and including alert capabilities. Other aspects of the system provide for the ability to maintain historical data identifying when the storage units have been accessed by users and the time and date corresponding to each access.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. An enclosure having an improved access system comprising:

a frame of a server cabinet, the frame comprising a plurality of panels;

a door connected to the frame in a manner that allows the door to rotate from a closed position to an open position with respect to the frame to allow access to an interior of the server cabinet;

an electromechanical locking mechanism that includes a rotating handle such that the electromechanical locking mechanism is configured to fit in the door and to secure the door to the frame in the closed position when in a locked state and allow the door to be rotated to the open position in an unlocked state;

at least one radio frequency sensor configured to detect movement of an object within the enclosure;

a biometric scanner configured to receive biometric information from a user;

a memory configured to store data representative of biometric information; and a processing device operatively connected to the memory, the biometric scanner, the radio frequency sensor, and the electromechanical locking mechanism, wherein the processing device is configured to receive the biometric information from the biometric scanner and data from the radio frequency sensor, compare the biometric information received from the biometric scanner to the data stored in the memory, and instruct the electromechanical locking mechanism to change states based on whether the biometric information received from the biometric scanner matches at least a portion of the data stored in the memory, wherein:

the biometric scanner includes a biometric acquisition area and the biometric acquisition area is integrated into the electromechanical locking mechanism;

the electromechanical locking mechanism is configured to change states approximately simultaneously with the user's ability to operate the rotating handle; and at least one of the plurality of panels comprises a wire mesh such that size of holes of the wire mesh is dictated by radio frequency field used by the radio frequency sensor.

2. The enclosure of claim 1 wherein the biometric acquisition area is a fingerprint scanner such that the biometric acquisition area is inserted into a rear side of the electromechanical locking mechanism and a portion of the biometric acquisition area is accessible to the user through an aperture of the electromechanical locking mechanism such that the portion of the biometric acquisition area includes an exposed surface that is oblique with respect to a front surface of the server cabinet and the biometric acquisition area is accessible at all times.

3. The enclosure of claim 1 wherein the biometric acquisition area is a retinal scanner such that the biometric acquisition area is inserted into a rear side of the electromechanical locking mechanism and a portion of the biometric acquisition area is accessible to the user through an aperture of the electromechanical locking mechanism.

4. The enclosure of claim 1 further comprising a radio frequency identification ("RFID") reader operatively connected to the processing device and configured to receive RFID data, wherein the memory is configured to store data representative of RFID data, and wherein the processing device is configured to receive the RFID data from the RFID reader, compare the RFID data received from the RFID reader to the data representative of RFID data stored in the memory, and instruct the electromechanical locking mechanism to change states based on whether the RFID data received from the RFID reader matches at least a portion of the data representative of RFID data stored in the memory.

5. The enclosure of claim 4 wherein the processing device is configured to instruct the electromechanical locking mechanism to change states based on whether the RFID data received from the RFID reader is associated with the biometric information received from the biometric scanner.

6. The enclosure of claim 1 further comprising a personal identification number ("PIN") pad operatively connected to the processing device and configured to receive a PIN number, wherein the memory is configured to store a plurality of PIN numbers, and wherein the processing device is configured to receive the PIN number from the PIN pad, compare the PIN number received from the PIN pad to the plurality of PIN numbers stored in the memory, and instruct the electromechanical locking mechanism to change states based on whether the PIN number received from the PIN pad matches one of the plurality of PIN numbers stored in the memory.

7. The enclosure of claim 6 wherein the processing device is configured to instruct the electromechanical locking mechanism to change states based on whether the PIN number received from the PIN pad is associated with the biometric information received from the biometric scanner.

8. The enclosure of claim 1 wherein the electromechanical locking mechanism and the biometric scanner are configured to receive power via power over Ethernet.

9. The enclosure of claim 1 further comprising at least one additional sensor that is operatively configured to monitor for an occurrence of a condition and configured to transmit a signal to the processing device, whereby the processing device determines whether the condition has occurred based on the signal.

10. The enclosure of claim 9 wherein the at least one additional sensor is a charge-coupled device and the processing device is configured to determine that the condition has occurred based on a change in the signal.

11. The enclosure of claim 9 wherein the at least one additional sensor includes at least one of (i) a charge-coupled device and (ii) a temperature sensor.

12. The enclosure of claim 9 wherein the processing device is configured to generate an alarm condition when the condition occurs.

13. The enclosure of claim 12 wherein the alarm condition causes a speaker associated with the server cabinet to output an audible alert.

14. The enclosure of claim 9 wherein the processing device outputs a second signal to another device when the condition has occurred.

15. The enclosure of claim 9 wherein the processing device transmits an electronic message to an administrator associated with the server cabinet.

16. The enclosure of claim 9 wherein the at least one additional sensor includes sensors located on each of the plurality of panels such that each sensor is configured to detect movement of the respective panel and the condition is removal of one of the plurality of panels of the server cabinet.

17. The enclosure of claim 9 wherein the condition is met when the door opens.

18. An electromechanical locking mechanism for a server cabinet having a frame with a plurality of panels and a door, wherein the door defines an aperture and is connected to the frame in a manner that allows the door to rotate from a closed position to an open position with respect to the frame, the electromechanical locking mechanism comprising:

a rotating handle;

a locking portion configured to pass through the aperture whereby the electromechanical locking mechanism is configured to secure the door to the frame in the closed position when the locking portion exhibits a locked stated and allow the door to be rotated to the open position when the locking portion exhibits an unlocked state to allow access to an interior of the server cabinet;

at least one radio frequency sensor configured to detect movement of an object within the enclosure;

an external portion configured to include a biometric acquisition area to integrate the biometric acquisition area within the electromechanical locking mechanism, whereby the external portion is configured to present the biometric acquisition area to a user when the door is in the closed position, the biometric acquisition area being configured to receive biometric information from the user; and a control circuitry configured to receive a control signal instructing the electromechanical locking mechanism to change states of the locking portion, wherein the electromechanical locking mechanism is configured to change states approximately simultaneously with the user's ability to operate the rotating handle, and at least one of the plurality of panels comprises a wire mesh such that size of holes of the wire mesh is dictated by radio frequency field used by the radio frequency sensor.

19. The mechanism of claim 18 wherein the biometric acquisition area is a fingerprint scanner such that the biometric acquisition area is insertable into a rear side of the external portion and a portion of the biometric acquisition area is accessible to the user through an aperture of the external portion such that the portion of the biometric acquisition area includes an exposed surface that is oblique with respect to a front surface of the server cabinet and the biometric acquisition area is accessible at all times.

20. A method for managing access to a server cabinet having a frame comprising a plurality of panels, a door, an electromechanical locking mechanism, and a biometric scanner, wherein the door is connected to the frame in a manner that allows the door to rotate from a closed position to an open position with respect to the frame, and wherein the electromechanical locking mechanism includes a rotating handle and is configured to fit in the door to secure the door to the frame in the closed position when in a locked state and allows the door to be rotated to the open position when in an unlocked state, the method comprising:

receiving at a processing device biometric information from the biometric scanner;

obtaining data from at least one radio frequency sensor;

comparing the biometric information to data stored in memory operatively connected to the processing device; and instructing the electromechanical locking mechanism to change states based on whether the biometric information matches at least a portion of the data to allow access to an interior of the server cabinet, wherein:

the biometric scanner includes a biometric acquisition area and the biometric acquisition area is integrated into the electromechanical locking mechanism;

the processing device is configured to instruct the electromechanical locking mechanism to change states approximately simultaneously with a user's ability to operate the rotating handle; and at least one of the plurality of panels comprises a wire mesh such that size of holes of the wire mesh is dictated by radio frequency field used by the radio frequency sensor.

21. The method of claim 20 further comprising generating an alarm when the at least a portion of the data comprises an indication that the biometric information is associated with a duress finger.

* * * * *